(12) United States Patent
Lloyd

(10) Patent No.: US 11,202,490 B1
(45) Date of Patent: Dec. 21, 2021

(54) SMART BAG

(71) Applicant: Quiana Lloyd, Atlanta, GA (US)

(72) Inventor: Quiana Lloyd, Atlanta, GA (US)

(\*) Notice: Subject to any disclaimer, the term of this patent is extended or adjusted under 35 U.S.C. 154(b) by 416 days.

(21) Appl. No.: 15/932,358

(22) Filed: Feb. 16, 2018

Related U.S. Application Data

(60) Provisional application No. 62/461,697, filed on Feb. 21, 2017.

(51) Int. Cl.
*A45C 3/06* (2006.01)
*A45C 15/00* (2006.01)
*A45C 13/10* (2006.01)
*H02J 7/00* (2006.01)
*H02J 7/02* (2016.01)

(52) U.S. Cl.
CPC ............... *A45C 15/00* (2013.01); *A45C 3/06* (2013.01); *A45C 13/103* (2013.01); *A45C 13/1069* (2013.01); *H02J 7/0042* (2013.01); *H02J 7/025* (2013.01)

(58) Field of Classification Search
CPC ....... A45C 15/00; A45C 13/1069; A45C 3/06; A45C 13/103; H02J 7/0042; H02J 7/035
USPC .......................... 150/106, 118; 190/102, 902
See application file for complete search history.

(56) References Cited

U.S. PATENT DOCUMENTS

| | | | | |
|---|---|---|---|---|
| 2,560,437 A | * | 7/1951 | Guenther | A45C 13/103 190/119 |
| 3,117,607 A | * | 1/1964 | Siegel | A45C 9/00 150/117 |
| 5,725,039 A | * | 3/1998 | Macinai | A45C 3/08 150/104 |
| 6,637,484 B1 | * | 10/2003 | Kraft | A45C 7/0095 150/106 |
| 8,674,211 B1 | * | 3/2014 | Palmer | H02S 30/20 136/244 |
| 2003/0230368 A1 | * | 12/2003 | Cazes | A45C 1/024 150/106 |
| 2008/0110537 A1 | * | 5/2008 | Marmaropoulos | A45C 15/00 150/106 |
| 2009/0224722 A1 | * | 9/2009 | Causey | A45C 15/00 320/101 |
| 2014/0000771 A1 | * | 1/2014 | Sherman | A45C 3/06 150/106 |
| 2016/0058149 A1 | * | 3/2016 | Dhanasekaran | A45C 15/00 150/106 |

\* cited by examiner

*Primary Examiner* — Sue A Weaver
(74) *Attorney, Agent, or Firm* — Gibraltar Consulting LLC; Tariq S. Najee-ullah

(57) ABSTRACT

A smart bag, handbag, carryall for storing, transporting, and recharging multimedia devices, such as a smartphone, personal digital assistant (PDA), laptop, and the like, and having pockets and compartments for storing personal articles therein. The smart bag comprises stitchably joined panels and gussets that can be made from an array of fabrics, synthetic materials, or animal skins, such as leather. The body of the smart bag includes a rechargeable power source between inner lining and outer shell of the purse interconnecting various compartments via a restricted power cord arrangement, integral flexible electrical conduits stitchably disposed in seams, or wireless charging arrangement. The smart bag also has modular adaptability to include a coupling module and a removable clutch bag when the user does not require the storage capability of a conventional purse.

15 Claims, 15 Drawing Sheets

SMART BAG

REFERENCE TO RELATED APPLICATIONS

This application claims priority to Provisional Utility Patent Application No. 62/461,697 filed on Feb. 16, 2017. Provisional Utility Patent Application No. 62/461,697 is incorporated by reference herein. Applicant claims the earlier filing date.

TECHNICAL FIELD OF THE INVENTION

The technology described herein relates to the field of bags/totes and the storage and transport of multimedia devices. More specifically, the invention is a smart bag having modular adaptability and capable of interfacing with a plurality of multimedia devices while stylishly transporting and storing personal articles in a conventional manner.

BACKGROUND OF THE INVENTION

Handheld multimedia devices are omnipresent in our world today. These multimedia devices have become indispensable in personal, professional, and social settings. Hence, cell phones, smartphones, laptops, tablets, and other portable multimedia devices are transported by users in a multitude of vessels from pockets to backpacks to purses. These multimedia devices are typically rechargeable devices that require coupling to a power source via a power cord in a tethered arrangement. The power source may be an electrical outlet, portable charging device, or another multimedia device. Recharging a multimedia device via an electrical outlet restricts the mobility of a user and finding an electrical outlet in public settings can prove challenging and impractical at times given the restraints of a traditional power cord. Using a portable charging device can be inconvenient and requires being mindful of two devices that can easily be misplaced, lost, or stolen. Using another multimedia device, such as a laptop, can also be inconvenient and not practical when the need arises to recharge a multimedia device on the go—which occurs frequently when using multimedia devices. Hence, there exists a need for providing a stylish means of transporting a plurality of multimedia devices wherein said devices are capable of being recharged while in transport. Smart bags and handbags are known in the art, however none exists that meet the requirements of functionality and style for users that carry duffle bags, tote bags, and purses. Typically, purses are traditionally carried by women and the preferred embodiment of this invention teaches a purse form, but the scope of this invention anticipates the stylish incorporation of the following teachings in backpacks, knapsacks, man bags, man purses, baby bags, duffle bags, fanny packs, beach bags, tote bags, etc.

SUMMARY OF THE INVENTION

A smart bag, handbag, carryall for storing, transporting, and recharging multimedia devices, such as a smartphone, personal digital assistant (PDA), laptop, and the like, and having pockets and compartments for storing personal articles therein. The smart bag comprises stitchably joined panels and gusset(s) that can be made from an array of fabrics, synthetic materials, or animal skins, such as leather. The body of the smart bag includes a rechargeable power source between inner lining and outer shell of the purse interconnecting various compartments via a restricted power cord arrangement or integral flexible electrical conduits stitchably disposed in seams. The smart bag also has modular adaptability to include a coupling module and a removable clutch bag when the user does not require the storage capability of a conventional purse.

In alternative embodiments of the present invention, the battery power source can be recharged via a solar panel integrally disposed on the underside of the front flap for security purposes, thus not alerting a casual observer that the user is carrying a smart bag and adding to the "green" appeal of the purse.

In an embodiment of the present invention, a universal serial bus (USB) port is incorporated in the interior compartment of the smart bag and electrically coupled to the power source for interfacing with multimedia devices having USB-capability.

In yet another embodiment, the invention incorporates a tracking system and global positioning system in the power source that communicates via a mobile application (APP) with one or more multimedia devices of the user to facilitate locating the smart bag in the event it is stolen or misplaced.

Still yet another embodiment teaches a disposable smart bag for one-time or limited use.

DETAILED DESCRIPTION OF CERTAIN EMBODIMENTS

Figure 1A:
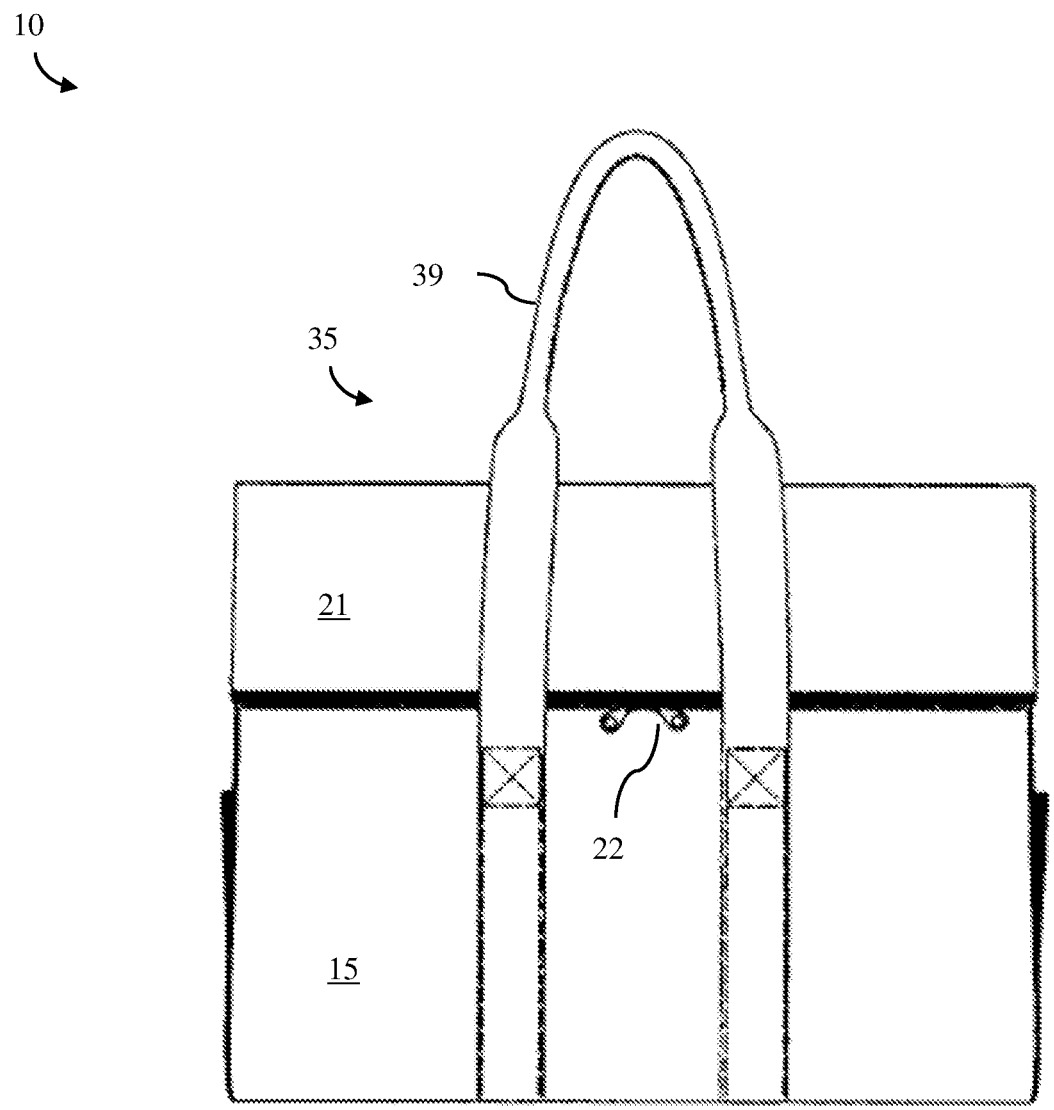
FIG. 1A and FIG. 1B are environmental perspective views of the front of the smart bag in a closed orientation (FIG. 1A) and an open orientation (FIG. 1B) according to an embodiment of the invention.

In preferred embodiments, the invention is a smart bag 10 having modular adaptability and capable of interfacing with a plurality of multimedia devices while stylishly transporting traditional articles personal articles in a conventional manner. As mentioned earlier, the following teachings of the preferred embodiment of the present invention are applicable to many styles of purses and forms of bags/carriers used to transport personal articles. No limitations are taught herein.

A smart bag 10 having an interior and exterior comprising a front panel 15, a back panel 20, a first side panel or gusset 25 and an opposing second side panel or gusset, a bottom platform 31, and a handle system 35 to facilitate transporting the smart bag 10.

Figure 1B:
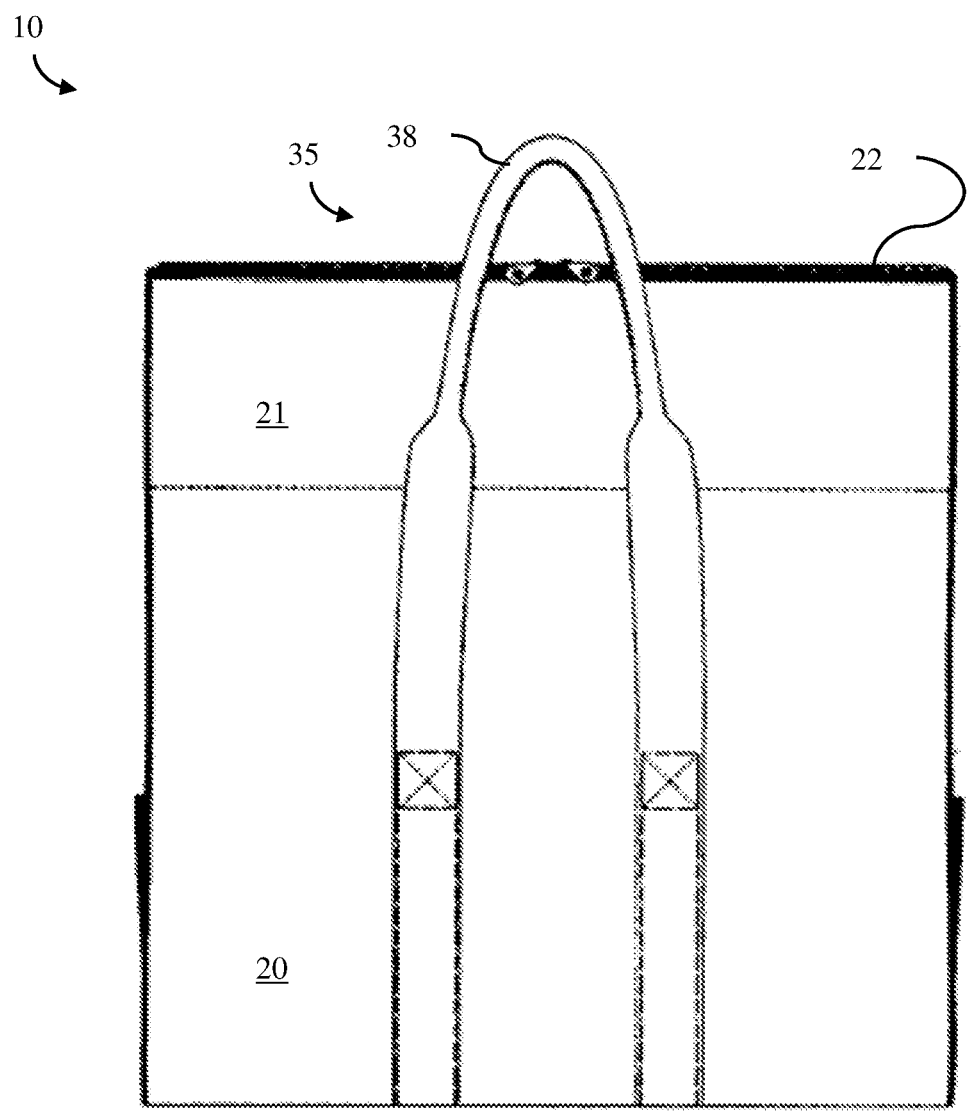
Figure 2A:
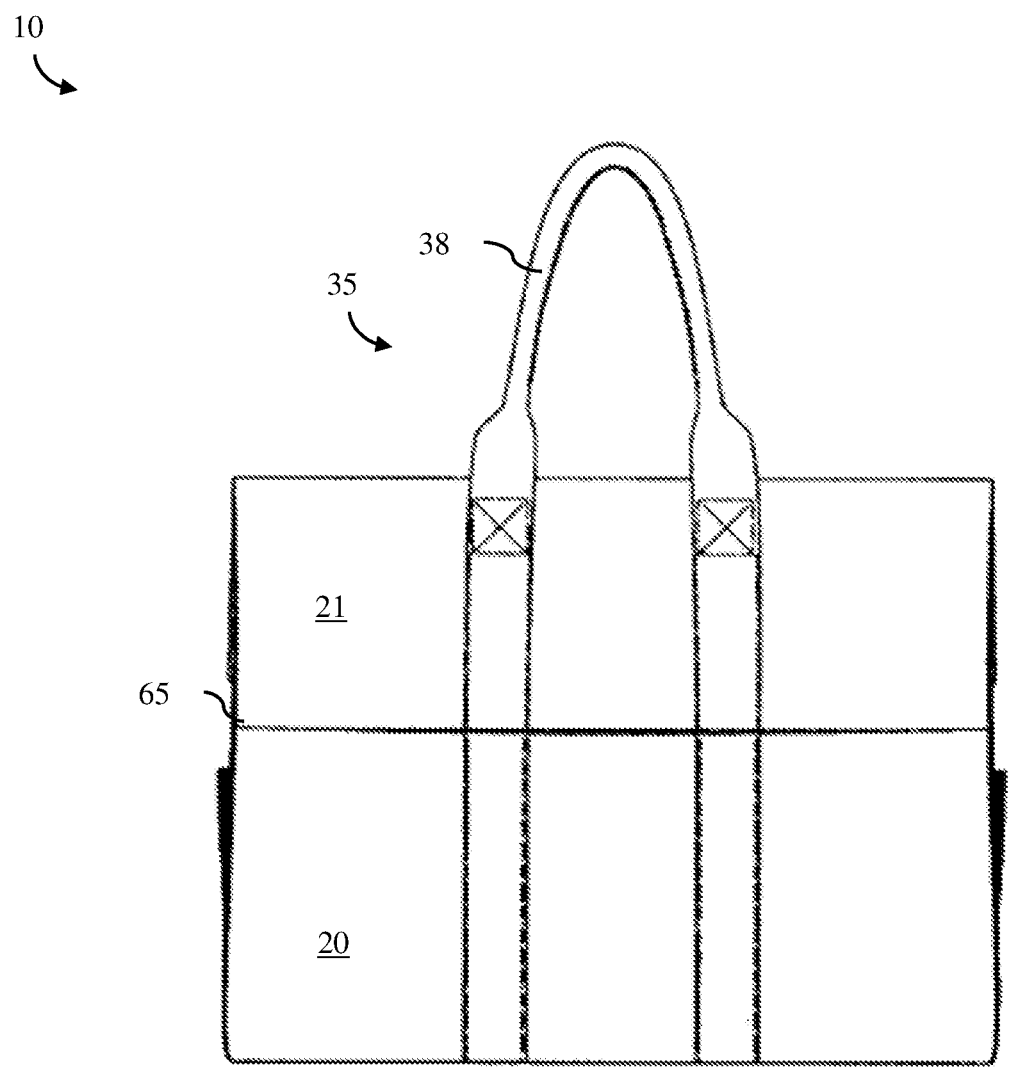
FIG. 2A is an environmental perspective view of the back of the smart bag without the removable clutch bag and FIG. 2B is a view of the back of the smart bag with the removable clutch bag according to an embodiment of the invention.
Figure 2B:
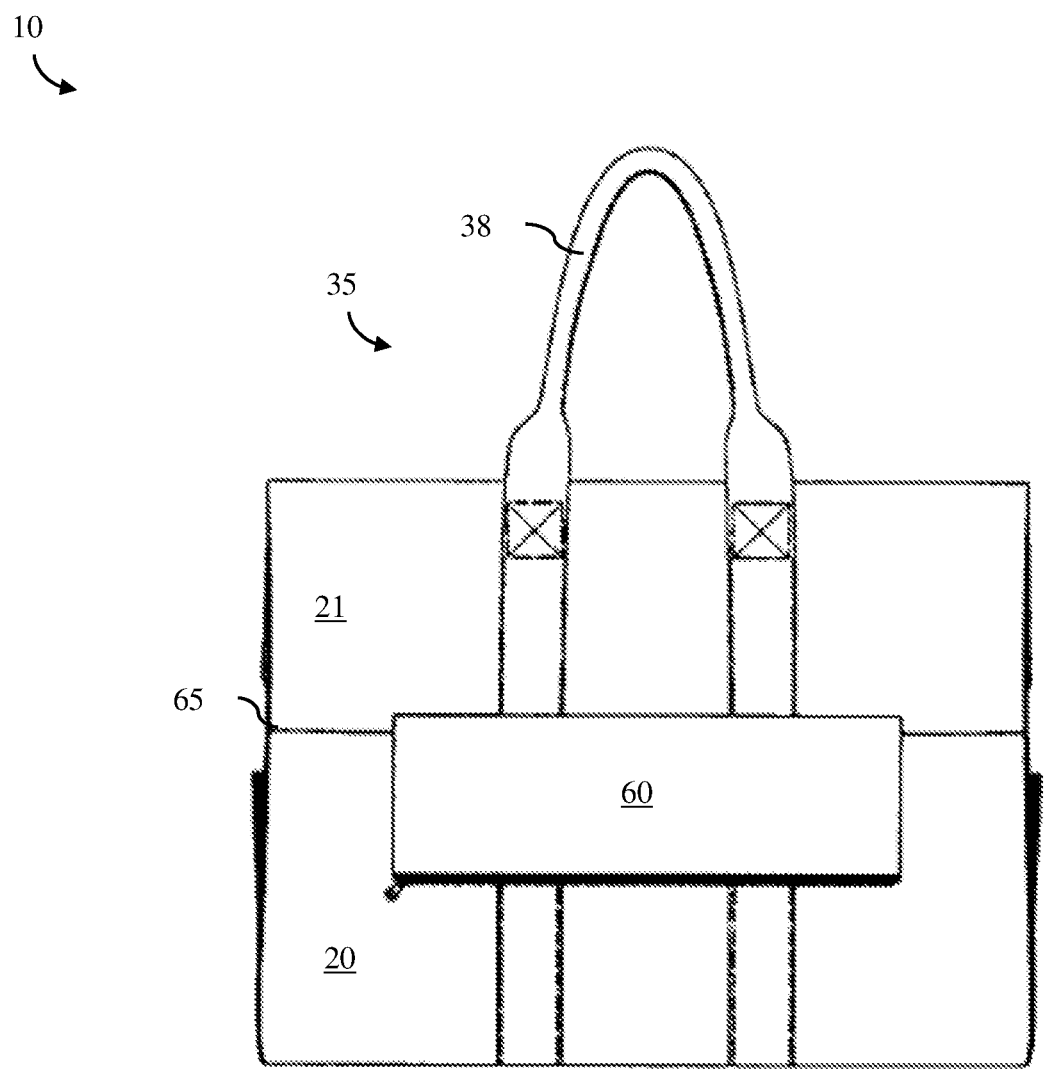

As seen in FIG. 1A and/or FIG. 1B, the front panel 15 is a flexible assembly that can be made from an array of fabrics, synthetic materials, or animal skins, such as leather. As seen in FIG. 2, the back panel 20 is a flexible assembly that can be made from an array of fabrics, synthetic materials, or animal skins, such as leather. As seen in FIG. 1A, FIG. 1B, FIG. 2A, and/or FIG. 2B, the back panel 20 includes a flap portion 21 that extends beyond the length of the front panel 15 and is designed to fold over the exterior of the front panel 15 and secure to said exterior via a conventional fastening means, such as a zipper system 22, magnetic clasp(s) or button snap(s) arrangement. The flap 21 can be designed to cover a portion or the entire exterior of the front panel 15.

Figure 4A:
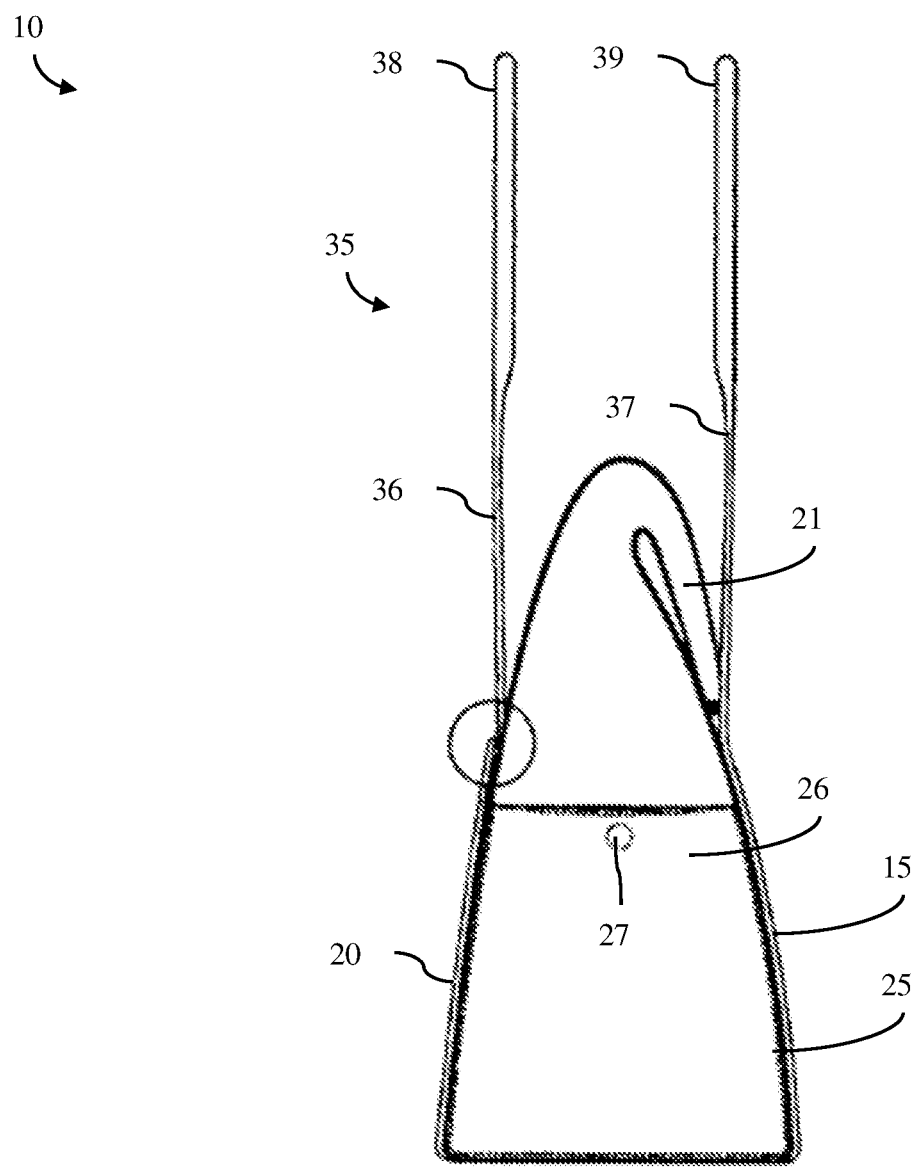
FIG. 4A is an exterior view of a gusset and FIG. 4B is an interior view of the gusset of the smart bag according to an embodiment of the invention.
Figure 4B:
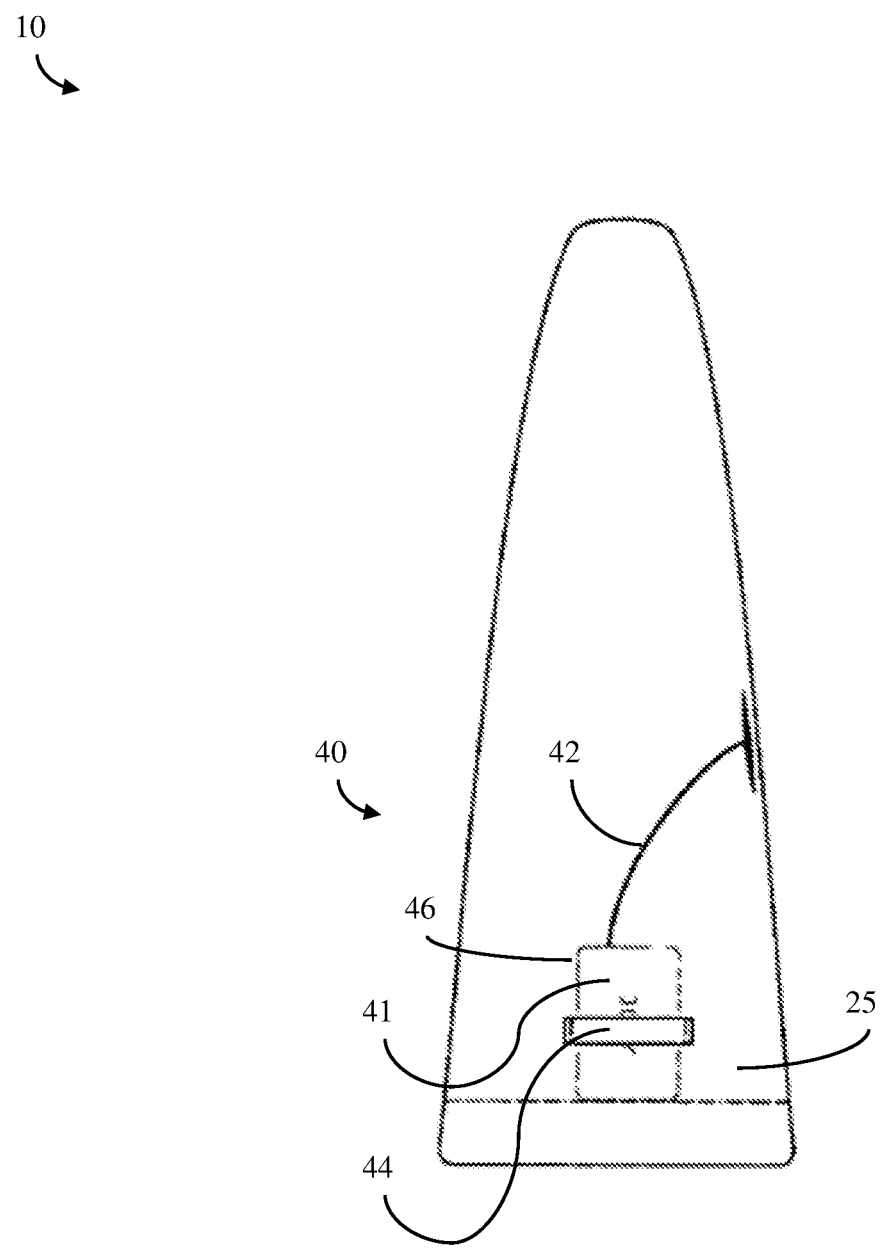

As seen in FIG. 4A and/or FIG. 4B, a first gusset 25 and an opposing second gusset (not shown) can be made from an array of fabrics, synthetic materials, or animal skins, such as leather. The gusset(s) 25 are disposed on opposing sides and stitchably secured in a seam arrangement to the corresponding side edges of the front panel 15 and back panel 20 to form the interior of the smart bag 10.

Also seen in FIG. 4A and/or FIG. 4B, the exterior of one or both gussets 25 features an additional layer of fabric, synthetic materials, or animal skin, such as leather overlaid and stitchably connected to the gusset(s) 25 form a slip pocket(s) 26 on the exterior of the smart bag 10 for quick storage and removal of personal articles. A magnetic fastening arrangement 27 is included to facilitate opening and closing the slip pocket 26.

Also seen in FIG. 1A, FIG. 1B, FIG. 2A, FIG. 2B, FIG. 3, FIG. 4A, and/or FIG. 4B, a handle system 35 can be made from an array of fabrics, synthetic materials, or animal skins, such as leather. The handle system is comprised of opposing flexible elongated straps 36,37. The ends of the opposing straps are formed into corresponding handles 38,39. The midpoint of the handle system 35 can be centered on the underside of the smart bag 10. The handle system 35 terminates at the bottom edge of the front panel 15 and the back panel 20 in the preferred embodiment. The handle system 35 is stitchably secured to the exterior of the smart bag 10 where the corresponding straps 36,37 are uniformly spaced apart thereon. The straps 36,37 of the handle system are stitchably secured to the bottom edges of the front panel 15 and back panel 20 of the smart bag 10 extending up the exterior of the front panel 15 and back panel 20 to a point at or beyond the midsection of the front panel 15 and back panel 20 but below the top edges of the front panel 15 and back panel 20. The portions of the straps 36,37 beyond the point of termination of the stitching are flexible and allow the user to selectively clasp the opposing handles 38,39 together to facilitate carrying the smart bag 10 or release the opposing handles 38,39 to allow opening the flap 21 to access the interior of the smart bag 10.

Figure 5:
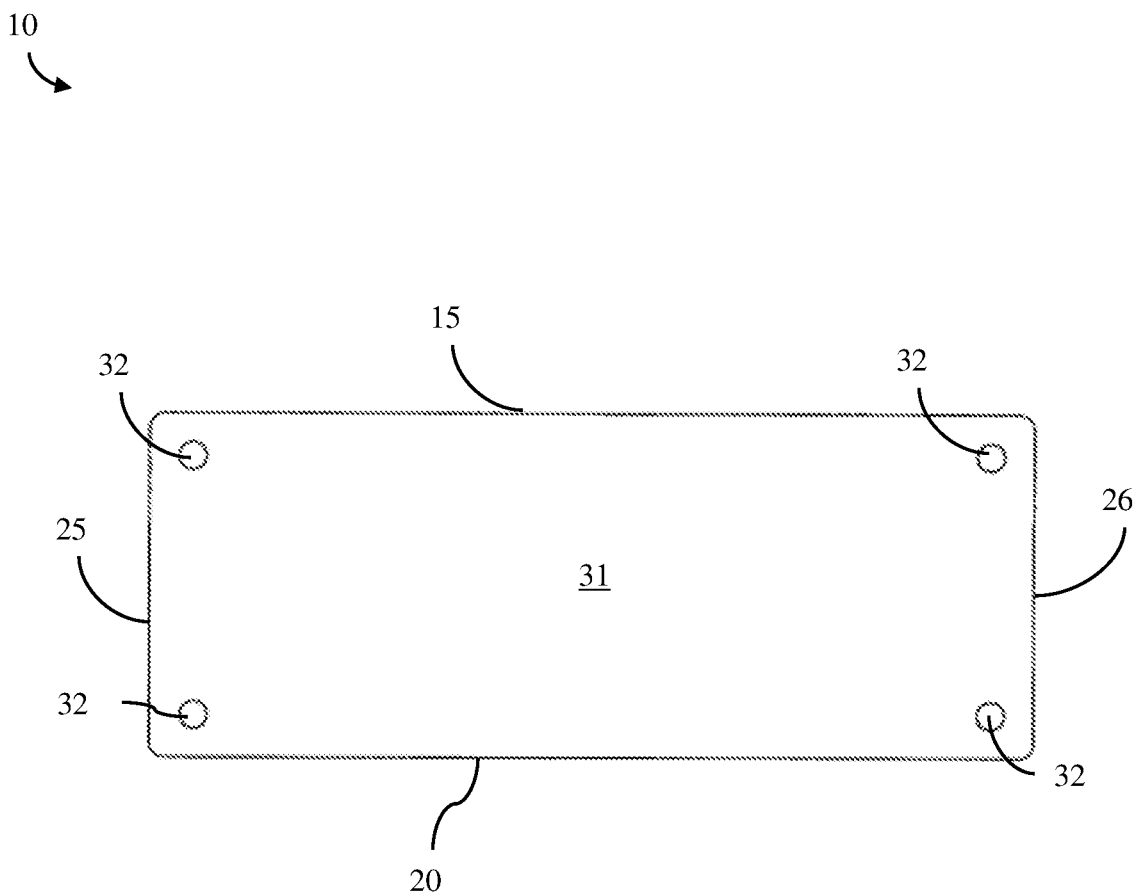
FIG. 5 is a planar view of the bottom of the smart bag according to an embodiment of the invention.

As seen in FIG. 5, the bottom panel 31 is a rigid or semi-rigid platform to which the bottom edges of the front panel 15 and back panel 20 and the bottom edges of the gusset(s) 25,26 are permanently attached to the respective edges of the bottom panel 31. The underside of the smart bag 10 can be covered in an array of fabrics, synthetic materials, or animal skins, such as leather. A plurality of support feet 32 are generally disposed and spaced apart in the corners on the underside of the bottom panel 31 to support the bottom panel 31 above any surface upon which the smart bag 10 is placed. The bottom panel 31 may also be a flexible assembly made from an array of fabrics, synthetic materials, or animal skins, such as leather.

Figure 6A:
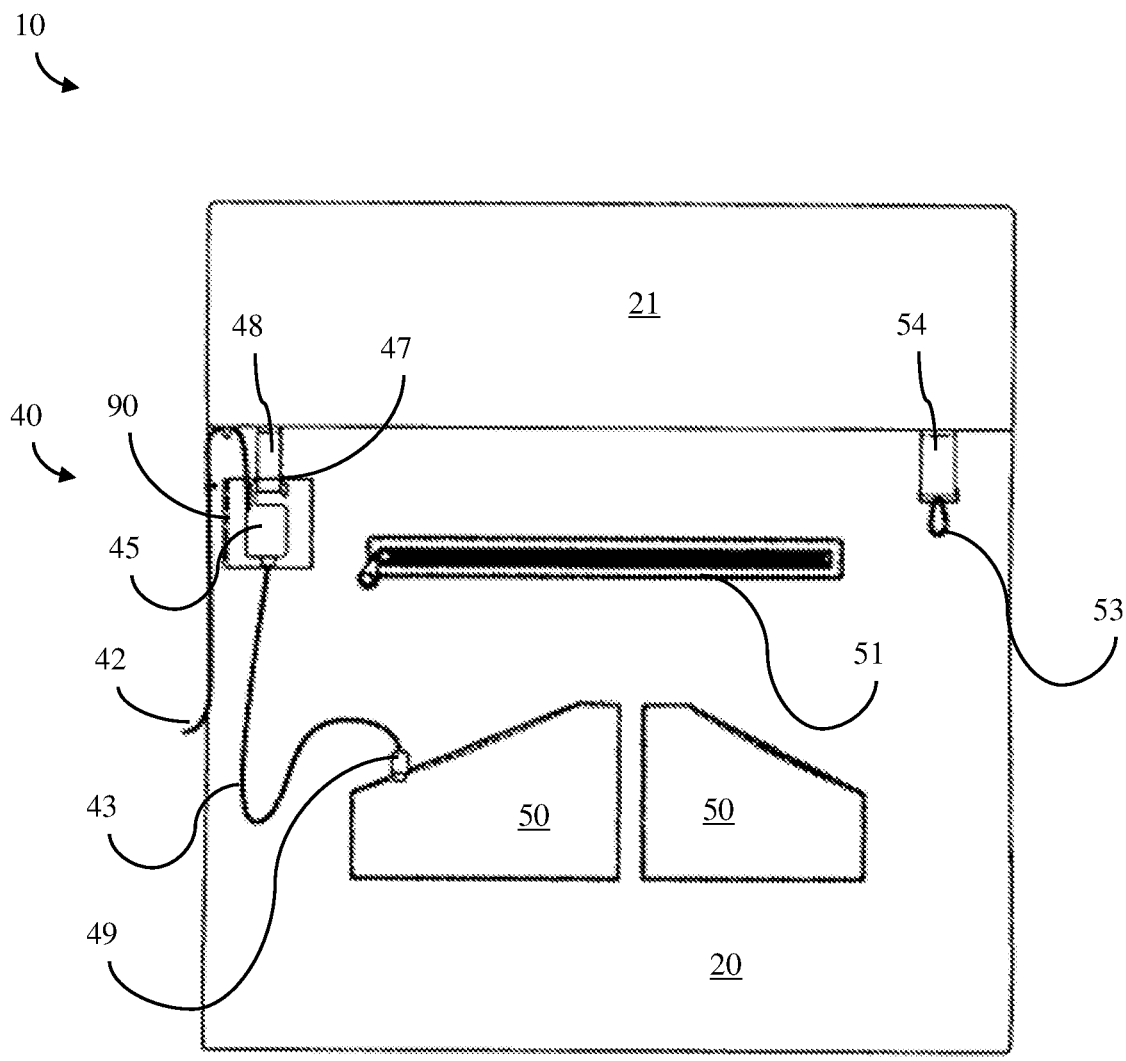
FIG. 6A is a view of an interior front wall and FIG. 6B is a view of the opposing interior wall of the smart bag according to an embodiment of the invention.
Figure 6B:
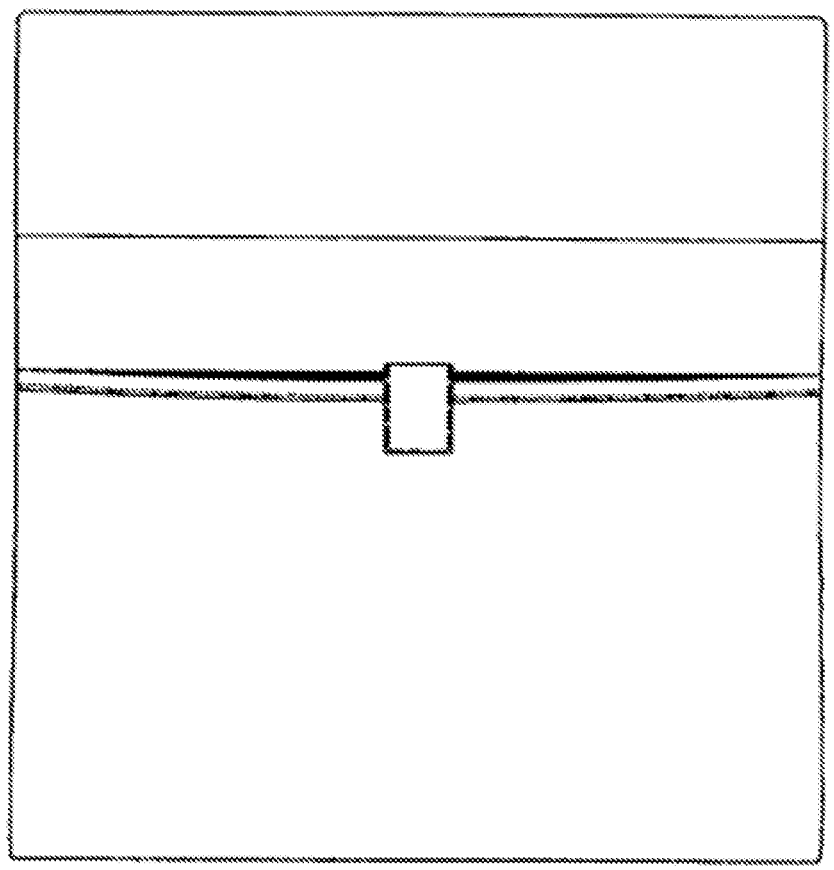
Figure 7A:
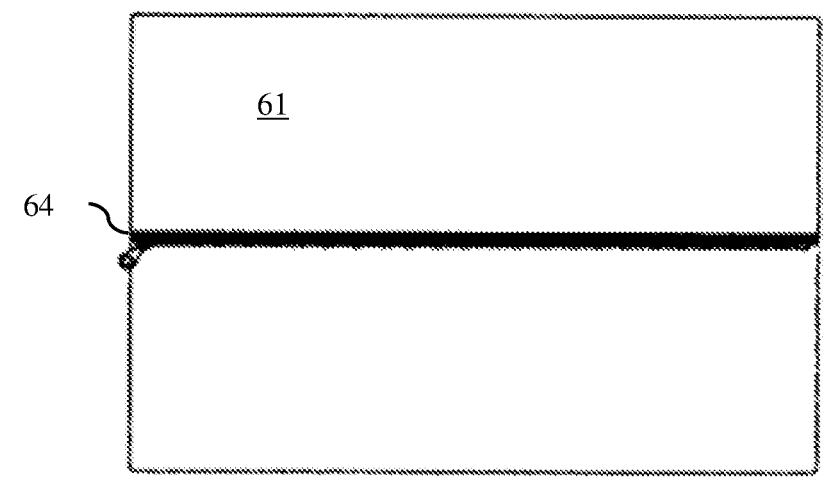
FIG. 7A, FIG. 7B, and FIG. 7C are environmental perspective views of the removable clutch bag in a folded orientation (FIG. 7A) and an unfolded orientation (FIG. 7B, FIG. 7C) according to an embodiment of the invention.
Figure 7B:
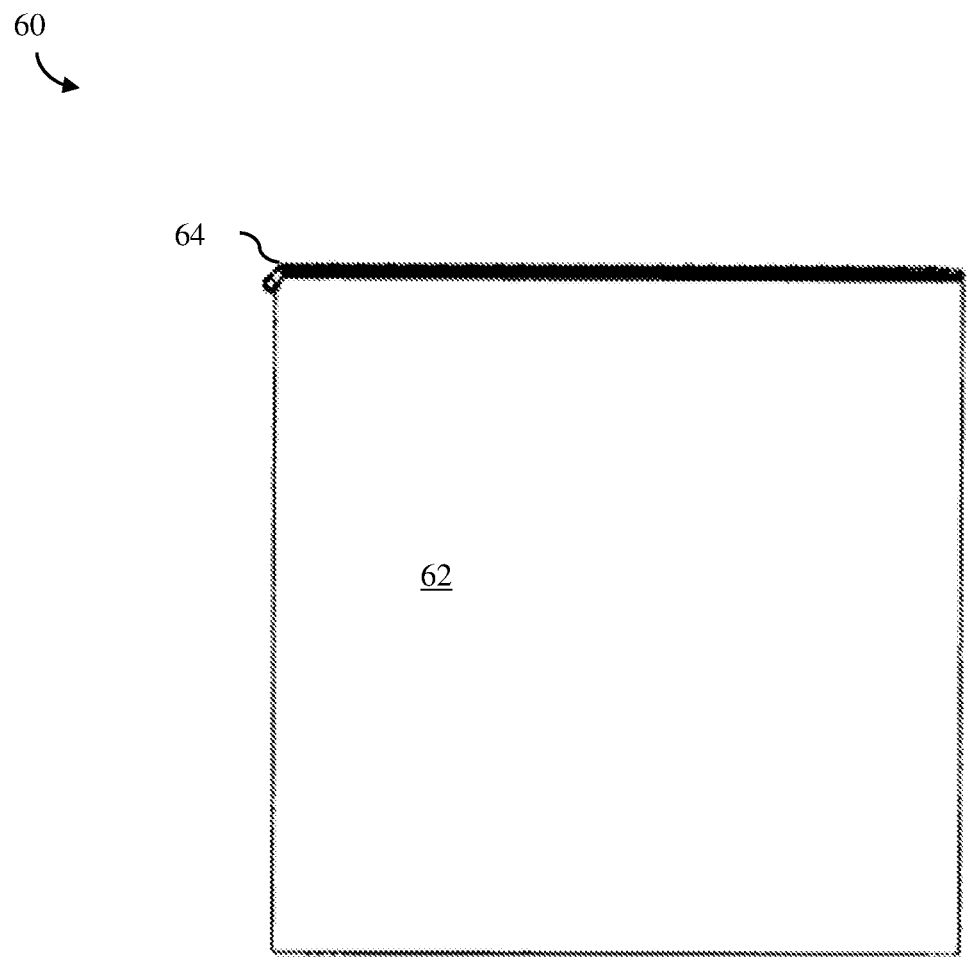
Figure 7C:
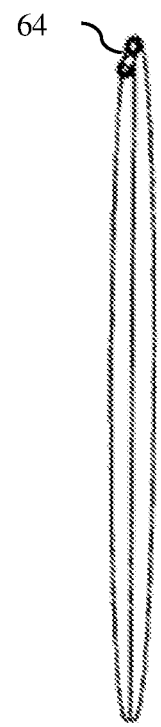

As seen in FIG. 4A, FIG. 4B, FIG. 6A, and/or FIG. 6B, the interior of the smart bag 10 houses an electrical system 40 capable of coupling to and recharging one or more multimedia devices. In the preferred embodiment, the electrical system 40 is disposed in the back panel 20 and a gusset 25. However, the placement of the electrical housing may vary in alternative embodiments of the invention. The electrical system 40 of the preferred embodiment comprises a battery power source 41, flexible electrical conduits 42,43, and a coupling module 45.

As seen in FIG. 4A and/or FIG. 4B, the battery power source 41 can be a lithium battery or any conventional power cell suitable for the purposes outlined herein. The battery power source 41 is ideally disposed in a substantially planar housing, as a bulky housing is less likely to offer the sleek lines that are preferable in construction of the smart bag 10. As seen in FIG. 4A and/or FIG. 4B, the battery power source 41 is ideally concealed on a gusset 25 of the smart bag 10. The battery power source 41 is stored in a space or pocket 46 between the wall of a gusset 25 and the interior lining sufficiently spaced apart from the bottom edge of a gusset 25 as to create a "crumple zone" that protects the battery power source 41 from impact damage or vibratory shock if the smart bag 10 is dropped. A retaining strap 44 spans across the battery power source 41 as stored in a space or pocket 46. The top edge of this storage pocket 46 for the battery power source may feature a sealing system, such as a zipper closure or hook and loop fasteners, to selectively remove or restore the battery power source 41 from the storage pocket 46.

Also seen in FIG. 4A, FIG. 4B, FIG. 6A, and/or FIG. 6B, the battery power source 41 is electrically coupled to a flexible electrical conduit 42 that extends from the storage pocket 46 in a concealed manner between the inner lining and gusset wall 25. The flexible electrical conduit 42 emerges from an aperture near the top edge of the gusset 25 and terminates in a tethered arrangement along the top edge of a coupling module 45. A portion of the flexible electrical conduit 42 may be exposed. Said portion may be secured to the seam lines using a conventional anchoring system, such as woojin clips or hook and loop fastening straps, which limit movement.

As seen in FIG. 6A and/or FIG. 6B, the coupling module 45 serves as an electrical intermediary between the battery power source 41 and a connected multimedia device(s). The coupling module 45 is a substantially planar housing having a hook arm 47 disposed on the top edge to facilitate introduction of the hook into a loop 48 downwardly protruding from the top edge of the back panel 20 near the fold line of the flap 21. Once the hook arm 47 is secured in the loop 48, the coupling module 45 rests in a suspended manner therefrom. The coupling module 45 may be suspended in a pocket 90 created between the inner lining and the wall of the back panel 20 of the smart bag 10. Ideally, the coupling module 45 is suspended from the aforementioned loop 48, but can be moved as required for certain applications.

As seen in FIG. 6A and/or FIG. 6B, a second flexible electrical conduit 43 depends from the bottom edge of the coupling module 45 and terminates in a male connecting prong 49 at the distal end. The connecting prong is inserted in the female receiving port of the multimedia device, thus closing the electrical circuit 40 and effectuating the charging of the coupled multimedia device. Alternatively, the second flexible electrical conduit 43 may terminate in a multi-prong arrangement that allows a user to recharge multiple devices simultaneously. The multiple connecting prongs may be identical or feature at least one different connecting prong to recharge different types of multimedia device, such as an iPhone® versus a Droid®, and at least one USB connecting prong.

The battery power source 41 has an integral sensor that which effectuates recharging of the multimedia device and terminates recharging of the multimedia device dependent upon the presence or absence of the connection of a multimedia device to the coupling module 45 and thus the battery power source 41. The coupling module 45 also includes a power level indicator to indicate the power level remaining in the battery power source, which lets a user when to recharge the battery power source 41. The battery power source 41 can be recharged by coupling a USB connecting prong into the USB port of a power module or cube having metal prongs capable of being inserted in a conventional electrical outlet, thus receiving the energy to recharge the battery power source 41. The battery power source 41 is adapted with a means to regulate voltage and prevent short circuiting. Finally, a coupled multimedia device is fully operational while connected to the electrical system of the smart bag 10.

The electrical system 40 of the preferred embodiment has been described herein, but is adaptable to a plethora of electrical systems 40 and configurations capable of effectuating the functionality and maintaining the stylish quality of the instant smart bag 10—all of which are in the scope of this invention. No limitations on the electrical systems and configurations are taught herein.

As seen in FIG. 6A and/or FIG. 6B, the interior of the back panel 20 of the smart bag 10 includes a plurality of pockets 50 and compartments 51 designed to hold at least one handheld multimedia device, at least one a stylus or writing instrument, at least one general personal article, flexible electrical conduits, and various digital storage devices. The number, types, and dimensions of pockets 50 and compartments 51 may vary without departing from the scope of this invention. A carabiner 53 is suspended via a loop 54 that is permanently attached to the top edge of the back panel 20 to accommodate storage of keys, keychains, mace, flashlight, or other small suspendable articles, which allows a user to find said items without having to exhaustively search the interior.

As seen in FIG. 6A and/or FIG. 6B, the second flexible electrical conduit 43 depends downwardly from the coupling module 45 and the majority of which can be stored in a cable management pocket 50 disposed below to prevent tangling and encourage organized storage. It is not uncommon for users to spend considerable amount of time searching for small items in purse. The cable management pocket 50 prevents flexible electrical conduit 43 from exacerbating the search for items in the smart bag 10. The user determines how much of the second flexible electrical conduit 43 must be exposed to reach stored multimedia devices to activate the recharging function. The unneeded portions of the second flexible electrical conduit 43 remain stored in the cable management pocket 50.

Also seen in FIG. 6A and/or FIG. 6B, the interior of the back panel 20 features a sealable compartment 51 designed to hold digital media storage devices or readable cards, such as debit cards and credit cards. Alternatively, this compartment can be specially lined with RFID blocking materials to prevent thieves from using wireless RFID skimmers to illegally obtain your personal and financial information, records and files.

As seen in FIG. 6A and/or FIG. 6B, the interior of the back panel 20 has at least one pocket 50 designed for receiving a multimedia device, such as a smartphone. If the user desires to recharge the multimedia device while inside the smart bag 10, the multimedia device must be oriented such that the female receiving port is oriented near the opening of the pocket 50 to permit coupling with the male connecting prong 49.

Figure 8A:
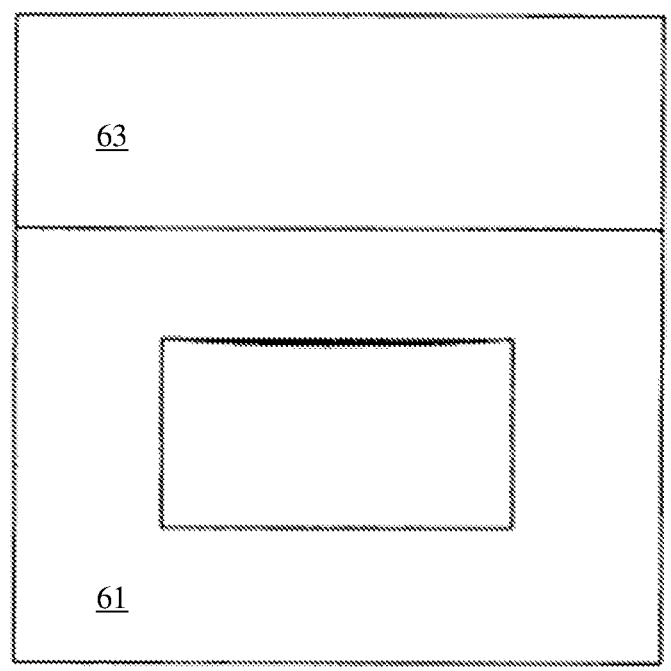
FIG. 8A is a planar view of an interior side of the removable clutch bag and FIG. 8B is a view of the opposing interior side of the removable clutch bag according to an embodiment of the invention.
Figure 8B:
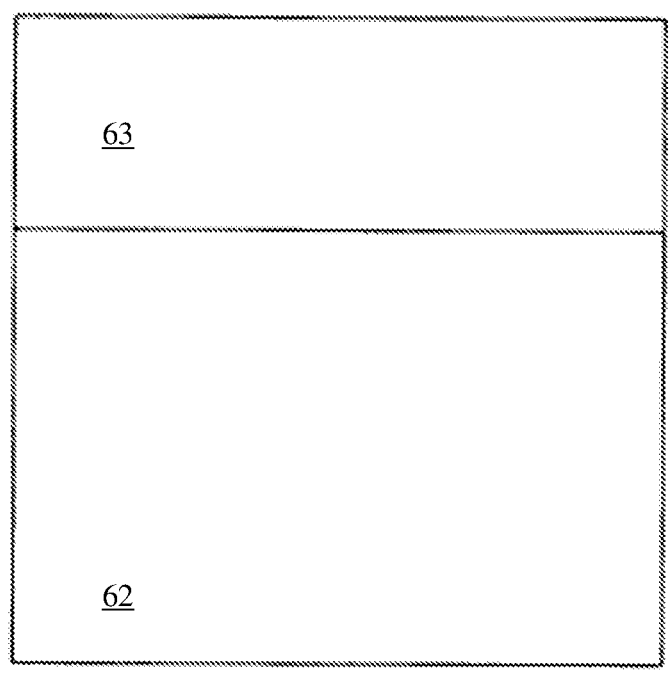

As seen in FIG. 2A, FIG. 2B, FIG. 7A, FIG. 7B, FIG. 7C, FIG. 8A, and/or FIG. 8B, the smart bag 10 teaches a removable clutch bag 60. The removable clutch bag 60 can be made from an array of fabrics, synthetic materials, or animal skins, such as leather. A clutch bag is typically much smaller in dimensions than a conventional purse, thus proving practical in situations where fashion or need do not require the extra storage of a purse. A removable clutch bag having an interior and exterior comprising a front panel 61 and a back panel 62. The back panel 62 includes a flap portion 63 that extends beyond the length of the front panel 61 and is designed to fold over the exterior of the front panel 61 and secure to said exterior via a conventional fastening means, such as a zipper system 64, magnetic clasp(s) or button snap(s) arrangement. The flap 63 can be designed to cover a portion or the entire exterior of the front panel 61. The removable clutch bag 60 can be releasably stored in an exterior pocket 65 on the back panel 20. Conventional securing methods, such as a concealed drop zipper, may be used to releasably couple the removable clutch bag 60 to said exterior pocket 65. The present invention teaches no limitations as to the incorporation of the removable clutch bag 60 or other modular components in the smart bag 10 of the present invention.

Figure 3:
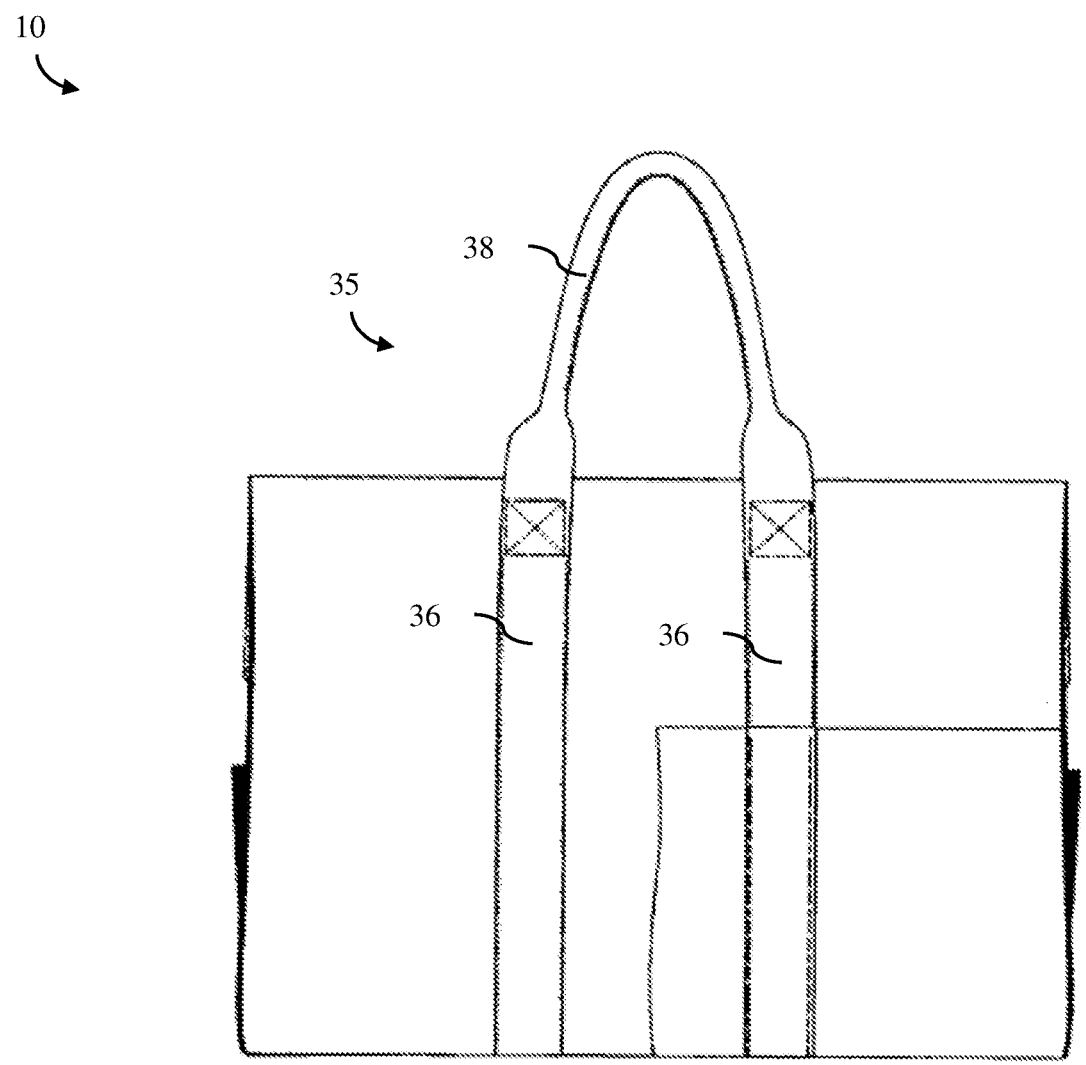
FIG. 3 is a view of the back of the smart bag with an exploded view of a segment of the handle of the smart bag according to an embodiment of the invention

In alternative embodiments of the present invention, the battery power source can be recharged via a solar panel integrally disposed on the underside of the front flap 21 for security purposes, thus not alerting a casual observer that the user is carrying a smart bag 10 and adding to the "green" appeal of the purse. As seen in FIG. 3, the underside of the folding flap 21 has sufficient area to mount a flexible panel which can be electrically tethered to the battery power source using flexible electrical conduit that is concealed between the inner lining and wall of the back panel 20. Flexible solar panels can also be decoratively concealed and mounted on the straps 36,37 of the handle system. Recharging the battery power source with a renewable energy source without having to compromise the stylish appearance of the smart bag 10 increases the appeal to those who are both conscious of fashion and the environment.

In an alternative embodiment of the invention, a USB port is incorporated in the interior compartment of the smart bag 10 and electrically coupled to the battery power source for interfacing with multimedia devices having USB capability. At least one USB port may be incorporated in the coupling module 45.

In yet another embodiment, the invention incorporates a tracking system and global positioning system (GPS) in the housing of the battery power source that communicates via a mobile application (APP) with one or more multimedia devices of the user to facilitate locating the smart bag 10 in the event it is stolen or misplaced. The user downloads an accompanying app to one or more multimedia devices. Once the user registers the smart bag 10 with the app, the BLUETOOTH®-enabled tracking system in conjunction with GPS allow a user to track the smart bag 10 even if the smart bag 10 is beyond the range of conventional BLUETOOTH® technology.

Alternative embodiments of the invention teach a disposable smart bag 10 for users in need of emergency recharging of their multimedia devices without the need for the stylish exterior or other fashion elements, but the require the functionality of carrying personal articles. Disposable smart bags can be purchased from a kiosk or vending machine in additional to traditional retail outlets.

Alternative embodiments of the invention also teach wireless recharging capability, thus eliminating the need of all or substantial portions of the flexible electrical conduits 42,43. With the advent of inductive charging technology, having to attach the connecting prong at the distal end of a flexible electrical conduit each time a user wants to recharge a multimedia device is eliminated. Wireless recharging capability can be seamlessly integrated in the present smart bag 10 without deviating from the scope of the invention.

Yet in other embodiments of the invention, the size of the smart bag and length of the handles may vary. The handles can also be arranged to be adjustable or an adjustable carrying strap with a first end and a second end may be included. In addition, the flap and any of the aforementioned pockets, such as the side pocket(s), may be removed without departing from the scope of this invention. These alternative designs afford more flexibility with the line of smart bags without departing from the scope of the invention.

While the preferred embodiment of the smart bag 10 has been described in detail, it should be apparent that modifications and variations thereto are possible, all of which fall within the true spirit and scope of the invention. With respect to the above description then, it is to be realized that the optimum dimensional relationships for the components of the invention, to include variations in size, materials, shape, form, function and manner of operation, assembly and use, are deemed readily apparent and obvious to one skilled in the art, and all equivalent relationships to those illustrated in the drawings and images and embodiments described in the specification are intended to be encompassed by the present embodiment of the invention. Moreover, the scope of this invention anticipates the stylish incorporation of the above teachings in backpacks, knapsacks, man bags, man purses, baby bags, duffle bags, fanny packs, beach bag, tote bags, etc. Hence, the present invention has been described above in terms of specific embodiments, it is to be understood that the invention is not limited to these disclosed embodiments.

The invention claimed is:

1. A smart bag, comprising:
    a front panel, a back panel, a first gusset, a second gusset, a bottom platform, a handle system, a clutch bag, and an electrical system configured to charge at least one device;
    wherein the back panel is irreversibly affixed to the front panel via the bottom platform, the first gusset, and the second gusset;
    wherein the back panel is reversibly affixable to the front panel via a flap portion of the back panel; and
    wherein the clutch bag is reversibly attachable to an exterior pocket of the back panel, reversibly insertable into the exterior pocket of the back panel, or both.

2. The smart bag of claim 1, wherein the electrical system comprises at least one of: a coupling module, a solar panel integrally disposed on an underside of the flap portion, and an inductive wireless charging feature.

3. The smart bag of claim 1, wherein the flap portion is reversibly affixable to an exterior of the front panel by a zipper arrangement.

4. The smart bag of claim 1, wherein the first gusset comprises a pocket on an exterior of the first gusset.

5. The smart bag of claim 1, wherein the first gusset comprises a pocket on an interior wall configured to provide access to a battery power source of the electrical system.

6. The smart bag of claim 1, wherein a space between an inner lining and a wall of the back panel houses a coupling module to facilitate charging the at least one device.

7. A smart bag, comprising:
    a front panel, a back panel, a first gusset, a second gusset, a bottom platform, a handle system, a clutch bag, and an electrical system comprising a battery power source configured to charge at least one device;
    wherein the back panel is irreversibly affixed to the front panel via the bottom platform, the first gusset, and the second gusset;
    wherein the back panel is reversibly affixable to the front panel via a coupling mechanism of a flap portion of the back panel;
    wherein at least one of the first gusset and the second gusset comprises at least one of an exterior pocket and an interior pocket;
    wherein the clutch bag is reversibly attachable to an exterior pocket of the back panel, reversibly insertable into the exterior pocket of the back panel, or both;
    wherein the electrical system comprises an operable wired connection, between the battery power source and either one connect prong or a plurality of connect prongs, that comprises a flexible electrical conduit and a coupling module;
    wherein the flexible electrical conduit is affixable to a seam line of the smart bag via a coupling mechanism of the seam line; and
    wherein the coupling module is disposable within a space between an inner lining and a wall of the back panel.

8. The smart bag of claim 7, wherein an interior of the back panel comprises a sealable compartment configured to prevent passage of at least one radiofrequency therethrough.

9. The smart bag of claim 7, wherein the electrical system comprises an operable wireless connection, between the battery power source and an inductive wireless charging feature, configured to recharge the battery power source via the inductive wireless charging feature.

10. The smart bag of claim 7, wherein the electrical system comprises a solar panel, integrally disposed on an underside of the flap portion and operably connected to the battery power source, configured to recharge the battery power source via solar radiation.

11. The smart bag of claim 7, wherein the electrical system comprises a wireless tracking feature configured for determination of a proximal location of the smart bag, a distal location of the smart bag, or both.

12. The smart bag of claim 7, wherein the smart bag is comprised of at least one of a fabric, a synthetic material, an animal skin, and any combination thereof.

13. The smart bag of claim 7, wherein the smart bag is configured for a single use by an individual.

14. The smart bag of claim 7, wherein the smart bag is configured to be visually appealing and safe for the environment.

15. A smart bag, comprising:
    a front panel, a back panel, a first gusset, a second gusset, a bottom platform, a handle system, a clutch bag, and an electrical system comprising a battery power source configured to charge at least one device;
    wherein the smart bag is comprised of at least one of a fabric, a synthetic material, an animal skin, and any combination thereof;

wherein the back panel is irreversibly affixed to the front panel via the bottom platform, the first gusset, and the second gusset;

wherein the back panel is reversibly affixable to the front panel via a zipper arrangement of a flap portion of the back panel;

wherein at least one of the first gusset and the second gusset comprises at least one of an exterior pocket and an interior pocket;

wherein the clutch bag is reversibly attachable to an exterior pocket of the back panel, reversibly insertable into the exterior pocket of the back panel, or both;

wherein an interior of the back panel comprises a sealable compartment configured to prevent passage of at least one radiofrequency therethrough;

wherein the electrical system comprises at least one of:

an operable wired connection, between the battery power source and either one connect prong or a plurality of connect prongs, that comprises a flexible electrical conduit and a coupling module, wherein the flexible electrical conduit is affixable to a seam line of the smart bag via a woojin clip, a hook and loop fastener, or both, and wherein the coupling module is disposable within a space between an inner lining and a wall of the back panel;

an operable wireless connection, between the battery power source and an inductive wireless charging feature, configured to recharge the battery power source via the inductive wireless charging feature;

a solar panel, integrally disposed on an underside of the flap portion and operably connected to the battery power source, configured to recharge the battery power source via solar radiation;

a wireless tracking feature configured for determination of a proximal location of the smart bag, a distal location of the smart bag, or both; and any combination thereof.

\* \* \* \* \*